US011901144B2

(12) United States Patent
Hofsaess

(10) Patent No.: US 11,901,144 B2
(45) **Date of Patent: *Feb. 13, 2024**

(54) TEMPERATURE-DEPENDENT SWITCH

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/586,090

(22) Filed: Jan. 27, 2022

(65) Prior Publication Data

US 2022/0148830 A1 May 12, 2022

Related U.S. Application Data

(63) Continuation of application No. 16/871,989, filed on May 11, 2020, now Pat. No. 11,393,647.

(30) Foreign Application Priority Data

May 14, 2019 (DE) ..................... 10 2019 112 581.2

(51) Int. Cl.
*H01H 37/04* (2006.01)
*H01H 37/54* (2006.01)
(Continued)

(52) U.S. Cl.
CPC ............ *H01H 37/04* (2013.01); *H01H 37/52* (2013.01); *H01H 37/54* (2013.01); *H01H 37/5427* (2013.01); *H01H 37/34* (2013.01)

(58) Field of Classification Search
CPC ........ H01H 37/04; H01H 37/52; H01H 37/54; H01H 37/5427; H01H 37/34; H01H 9/04
See application file for complete search history.

(56) References Cited

U.S. PATENT DOCUMENTS 3,054,074 A * 9/1962 Bird ........................ H01P 1/262
174/15.1
4,068,800 A * 1/1978 Doherty, Jr. ........... G05D 23/08
236/87
(Continued)

FOREIGN PATENT DOCUMENTS

CN 2289294 Y 8/1998
CN 203398009 U 1/2014
(Continued)

OTHER PUBLICATIONS

Klaschewski Elfriede; Neumann René, "Temperaturabhängiger Schalter mit Isolierscheibe", Jan. 5, 2017, Thermik Gerätebau GmbH, Entire Document (Translation of DE 102015110509). (Year: 2017).*
(Continued)

*Primary Examiner* — Stephen S Sul
(74) *Attorney, Agent, or Firm* — REISING ETHINGTON P.C.

(57) ABSTRACT

A temperature-dependent switch with a housing, which comprises a cover part having an upper side and a lower part having a raised peripheral wall, the upper section of which is bent onto the upper side of the cover part and thereby holds the cover part on the lower part, wherein two contact surfaces are provided outside at the housing and a switching mechanism is arranged in the housing, wherein the switching mechanism is configured to switch, depending on its temperature, between a closed state, in which the switching mechanism establishes an electrically conductive connection between the two contact surfaces, and an open state, in which the switching mechanism interrupts the electrically conductive connection between the two contact surfaces. A sealing ring is arranged on the upper side of the cover part, which sealing ring is in sealing contact with the bent upper section of the wall.

17 Claims, 5 Drawing Sheets

(51) Int. Cl.
*H01H 37/52* (2006.01)
*H01H 37/34* (2006.01)

(56) References Cited

U.S. PATENT DOCUMENTS

| | | | | | | |
|---|---|---|---|---|---|---|
| 4,121,074 | A | * | 10/1978 | Orcutt | H01H 35/343 | 200/283 |
| 4,134,299 | A | * | 1/1979 | Rueger | A47J 45/068 | 374/134 |
| 4,144,998 | A | * | 3/1979 | Wakabayashi | G05D 23/10 | 236/101 E |
| 4,389,629 | A | | 6/1983 | Saur et al. | | |
| 4,626,820 | A | | 12/1986 | Takahashi et al. | | |
| 4,757,165 | A | * | 7/1988 | Marcoux | H01H 5/30 | 337/343 |
| 4,794,214 | A | * | 12/1988 | Sanford | H01H 35/34 | 200/83 W |
| 4,887,062 | A | * | 12/1989 | Bletz | H01H 37/5436 | 337/299 |
| 5,038,093 | A | * | 8/1991 | Edwards | H02J 7/0045 | 429/96 |
| 5,078,115 | A | * | 1/1992 | Yamashita | H01H 37/54 | 123/549 |
| 5,877,671 | A | | 3/1999 | Hofsaess | | |
| 6,154,115 | A | * | 11/2000 | Flohr | H01H 71/40 | 337/299 |
| 6,249,211 | B1 | | 6/2001 | Hofsaess | | |
| 8,536,972 | B2 | | 9/2013 | Hofsaess | | |
| 10,541,096 | B2 | | 1/2020 | Hofsaess | | |
| 11,393,647 | B2 | * | 7/2022 | Hofsaess | H01H 37/54 | |
| 2012/0099266 | A1 | * | 4/2012 | Reber | G06F 1/182 | 361/679.26 |
| 2014/0167907 | A1 | * | 6/2014 | Hofsaess | H01H 37/04 | 29/622 |

FOREIGN PATENT DOCUMENTS

| | | | | | |
|---|---|---|---|---|---|
| CN | 206472417 | U | | 9/2017 | |
| CN | 108630470 | A | * | 10/2018 | H01H 13/04 |
| DE | 7333932 | U | | 3/1974 | |
| DE | 2415175 | A1 | | 10/1975 | |
| DE | 2600599 | A1 | | 7/1977 | |
| DE | 7804691 | U1 | | 8/1980 | |
| DE | 3733693 | A1 | | 5/1988 | |
| DE | 9102941 | U1 | | 6/1991 | |
| DE | 9214543 | U1 | | 12/1992 | |
| DE | 19517310 | A1 | | 11/1996 | |
| DE | 19623570 | A1 | | 1/1998 | |
| DE | 19754158 | A1 | | 5/1999 | |
| DE | 19827113 | C2 | | 11/2001 | |
| DE | 4143671 | C2 | | 2/2002 | |
| DE | 102009039948 | A1 | | 3/2011 | |
| DE | 102011104984 | A1 | | 8/2013 | |
| DE | 102013102089 | B4 | | 2/2015 | |
| DE | 102015110509 | A1 | * | 1/2017 | H01H 1/504 |
| DE | 102015114248 | A1 | | 3/2017 | |
| EP | 0445721 | A1 | | 9/1991 | |
| EP | 2506281 | A1 | | 10/2012 | |
| FR | 2114918 | A5 | | 6/1972 | |
| FR | 2417842 | A1 | | 9/1979 | |
| GB | 1346339 | A | | 2/1974 | |
| GB | 1481191 | A | | 7/1977 | |
| GB | 1539979 | A | | 2/1979 | |

OTHER PUBLICATIONS

Wang Junqing; Tang Yanqing, "Air hole structure of switch and switch thereof", Oct. 9, 2018, Xiamen Hongfa Automotive Electronics Co Ltd, Entire Document (Translation of CN 108630470). (Year: 2018).*

Office action issued by the German Patent Office for the application DE 10 2019 112 581.2 dated Apr. 27, 2020, 6 pages.

Search Report issued by the European Patent Office for the application 20173913.3, 7 pages.

Office action issued by the China National Intellectual Property Administration for appln. CN 202010402160.4 dated Jun. 29, 2022.

* cited by examiner

TEMPERATURE-DEPENDENT SWITCH

CROSS REFERENCE TO RELATED APPLICATIONS

This application is a continuation of U.S. patent application Ser. No. 16/871,989, filed May 11, 2020, and claims priority from German patent application DE 10 2019 112 581.2, filed on May 14, 2019. The entire contents of both of these applications are incorporated herein by reference.

BACKGROUND

This disclosure relates to a temperature-dependent switch.

An exemplary temperature-dependent switch is disclosed, for example, in DE 196 23 570 A1.

Such temperature-dependent switches are used to monitor the temperature of a device. For this purpose, the switch is, for example, brought into thermal contact with the device to be protected via one of its outer surfaces, so that the temperature of the device to be protected influences the temperature of the switching mechanism.

The switch is electrically connected in series with the supply circuit of the device to be protected via connecting leads which are attached to its outer contact surfaces by means of a material bond (e.g. by soldering or welding), so that below the response temperature of the switch, the supply current of the device to be protected flows through the switch.

The switch disclosed in DE 196 23 570 A1 comprises a deep-drawn lower part in which an inner circumferential shoulder is provided, on which shoulder a cover part rests. The cover part is held firmly on this shoulder by a raised and flanged edge of the lower part.

In the case of the switch disclosed in this publication, the cover part and the lower part are made of electrically conductive material. Therefore, an insulating foil is provided between them, which insulating foil extends parallel to the cover and is pulled up laterally so that its edge area extends to the upper side of the cover part. The flanged edge, i.e. the bent upper section of the wall of the lower part, in this switch presses onto the cover part, with an interposed insulating foil. The insulating foil thus serves to electrically insulate the two electrically conductive housing parts of the switch.

The switch disclosed in DE 196 23 570 A1 also includes a temperature-dependent switching mechanism, which comprises a spring snap disc supporting a movable contact member and a bi-metal disc fitted over the movable contact part. The spring snap disc presses the movable contact member against a stationary counter contact which is arranged inside at the cover part.

The edge of the spring snap disc is supported in the lower part of the housing, so that the electric current flows from the lower part through the spring snap disc and the movable contact member into the stationary counter contact and from there into the cover part.

A contact surface which is arranged centrally on the cover part serves as a first external terminal. A contact surface which is provided on the flanged edge of the lower part serves as a second external terminal. However, it is also possible to arrange the second external terminal not on the edge but on the side of the current-carrying housing or on the underside of the lower part.

DE 198 27 113 C2 discloses a switch having a so-called contact bridge that is attached to the spring snap disc, wherein the contact bridge is pressed by the spring snap disc against two stationary counter contacts provided on the cover part. In this case, both contacts of the switch, to which the external terminals are attached, are arranged on the cover part. The two contacts are electrically insulated from each other. In such a design variant of the switch, the cover part is made of an insulating material or a PTC thermistor. Such PTC thermistors are also called PTC resistors. For example, they are made of semiconducting, polycrystalline ceramics such as barium titanate ($BaTiO_3$).

With the switch disclosed in DE 198 27 113 C2, the current flows from one stationary contact through the contact bridge into the other stationary contact, which is also arranged on the cover part, so that the operating current does not flow through the spring snap disc itself. The contact bridge is therefore often also generally referred to as the current transfer member.

This design is particularly chosen if very high currents have to be switched, which can no longer be transferred without difficulty via the spring disc itself.

In the two design variants mentioned above, a bi-metal disc is provided for the temperature-dependent switching function, which bi-metal disc lies below its transition temperature in the switching mechanism in a force-free manner, wherein it is geometrically arranged between the movable contact member or contact bridge and the spring snap disc.

Herein, a bi-metal member is understood to be a multilayer, active, sheet metal shaped component comprising two, three or four inseparably connected components with different coefficients of thermal expansion. The connection of the individual layers of metals or metal alloys is by means of a material bond or positive locking and is achieved, for example, by rolling.

Such bi-metal members have a first stable geometrical conformation in their low-temperature position and a second stable geometrical conformation in their high-temperature position, between which they switch in a temperature-dependent manner in the manner of a hysteresis. If the temperature changes beyond their response temperature or below their reset temperature, the bi-metal members snap over into the other conformation, respectively. The bi-metal members are therefore often referred to as snap discs, wherein they may have an elongated, oval or circular shape when viewed from above.

If the temperature of the bi-metal member rises above the transition temperature as a result of an increase in the temperature of the device to be protected, the bi-metal member changes its configuration so that the movable contact member is kept at a distance from the stationary contact, thereby opening the switch and switching off the device to be protected and preventing further heating.

In the aforementioned designs of the temperature-dependent switch, the bi-metal disc is below its transition temperature preferably mounted in a mechanically force-free manner, wherein the bi-metal disc is preferably not to used for conducting the current.

This has the advantage that the bi-metal disc has a long service life and that the switching point, i.e. the transition temperature of the bi-metal disc, does not change even after many switching cycles.

If lower demands are made on the mechanical reliability or on the stability of the transition temperature, the bi-metal snap disc may also take over the function of the spring snap disc and possibly even that of the current transfer member, so that the switching mechanism merely includes a bi-metal disc, which then supports the movable contact member or comprises two contact surfaces instead of the current transfer member, so that the bi-metal disc not only provides the closing pressure of the switch, but also carries the current in the closed state of the switch.

Furthermore, some switches are provided with a parallel resistor which is connected in parallel to the external terminals. In the open state of the switch, this parallel resistor takes over part of the operating current and keeps the switch at a temperature above the transition temperature, so that the switch does not automatically close again after cooling down. Such switches are called self-holding.

Furthermore, some switches are equipped with a series resistor through which the operating current flowing through the switch flows. In this way, an ohmic heat is generated in the series resistor which is proportional to the square of the current flowing through it. If the current exceeds a permissible level, the heat of the series resistor causes the switching mechanism to open.

In this way, a device to be protected is disconnected from its supply circuit as soon as an excessive current flow is detected, which has not yet caused excessive heating of the device.

All of these different design variants may be realized with the herein presented switch.

Instead of a usually round bi-metal disc, a bi-metal spring clamped on one side may also be used, which bi-metal spring supports a movable contact member or a contact bridge or a current transfer member.

However, temperature-dependent switches may also be used, which do not comprise a contact plate as a current transfer member, but a spring member which supports the two counter contacts or at which the two counter contacts are formed. The spring member may be a bi-metal member, in particular a bi-metal snap disc, which not only provides the temperature-dependent switching function, but simultaneously also provides the contact pressure and carries the current when the switch is closed.

DE 195 17 310 A1 discloses a temperature-dependent switch which is similar in design to the one disclosed in DE 196 23 570 A1 mentioned at the outset, but in which the cover part is made of a PTC thermistor material and may rest, without an interposed insulating foil, on an inner circumferential shoulder of the lower part, onto which circumferential shoulder it is pressed by the flanged edge of the lower part.

In this way, the PTC thermistor cover is electrically connected in parallel to the two external terminals, giving the switch a self-holding function. This is also the case with the above-mentioned temperature-dependent switch with contact bridge disclosed in DE 198 27 113 C2.

With the known switches, the outer contact surfaces and the electrically conductive parts of the housing must still be electrically insulated after the connecting leads have been attached.

For insulation and pressure protection purposes, the switches are therefore often inserted into enclosures or protective caps, which serve for mechanical and/or electrical protection and shall often also protect the housing against the entry of contaminants. Examples of this can be found in the DE 91 02 941 U1, the DE 92 14 543 U1, the DE 37 33 693 A1 and the DE 197 54 158 A1.

Furthermore, DE 41 43 671 A1 discloses overmoulding the external terminals with a single-component thermoset. DE 10 2009 039 948 discloses encapsulating terminal lugs with an epoxy resin.

However, the use of enclosures or connection caps is often perceived as constructively too complex and unsatisfactory with regard to the thermal connection to the protective device.

Therefore, the switches are often provided with an impregnating varnish or protective lacquer after soldering the connecting leads. Sometimes the switches are also provided with so-called resin hoods, but this considerably increases the overall height of the switch. In addition, it is often not possible to ensure that the resin is dispersed completely. There is also the danger that the resin penetrates into open gaps and then reaches the inside of the switch.

In switches where the cover part is pressed onto the lower part with an insulating foil interposed there between, a problem of the lack of tightness of the switch often results from the insulating foil curling or folding when it is bent onto the upper side of the cover part. This causes a kind of drape of the insulating foil, which leads to the fact that the wall of the lower part cannot be bent far enough to the upper side of the cover part. Furthermore, this corrugation of the insulating foil on the upper side and on the circumferential wall of the cover part leads to the creation of creeping paths for liquids, so that when the switch is impregnated with protective lacquers, these may creep into the interior of the switch.

Even compared to other electrical insulating materials, the flanged edge of the lower part does not seal the upper side so well that it is ensured in any case that no liquid can get into the interior of the switch when resin is applied. This is particularly problematic as such creepage paths are hardly visible from outside and can therefore hardly be detected by a pure visual inspection.

Even when terminal leads are soldered to the upper side or the contact surface provided there, it cannot be completely prevented that solder or corresponding liquids get into the interior of the switch.

In the above-mentioned DE 196 23 570 A1, an attempt is made to reduce this problem by means of a circumferential bead which runs radially outwards on the underside of the cover part and presses on the insulating foil arranged between the lower part and the cover part.

DE 10 2015 114 248 A1 also proposes to provide a circumferential cutting burr on the shoulder of the lower part, which cutting burr cuts into the insulating foil. Although this solution has proven to be quite advantageous with regard to the mechanical sealing of the switch, it nevertheless has disadvantages. Particularly if the housing components are stored and processed as bulk material, these stamping burrs can be damaged or ground off, so that the tightness is again not sufficiently ensured. Such damage to the stamping burrs can hardly be seen with the naked eye, so that possible problem areas are usually not even noticeable during a visual inspection.

According to DE 10 2013 102 089 A1, an attempt is made to solve the above-mentioned problem of the insulating foil's corrugation or rosette formation when the upper section of the cover part is bent by cutting the edge of the insulating foil in a V-shape from outside, which greatly reduces the waviness. This has also led to an improved tightness of the switch.

Nevertheless, there is still a need to improve the mechanical tightness of such a temperature-dependent switch, since all the above-mentioned approaches have in practice led to at least minor disadvantages.

SUMMARY

It is an objective to improve the mechanical sealing of a temperature-dependent switch in a simple and inexpensive way.

According to a first aspect, a temperature-dependent switch is presented, which comprises a housing with a cover part having an upper side and a lower part having a peripheral wall, wherein an upper section of the peripheral wall is bent onto the upper side of the cover part and thereby holds the cover part on the lower part, wherein two contact surfaces are provided outside at the housing and a switching mechanism is arranged in the housing, wherein the switching mechanism is configured to switch, depending on its temperature, between a closed state, in which the switching mechanism establishes an electrically conductive connection between the two contact surfaces, and an open state, in which the switching mechanism interrupts the electrically conductive connection between the two contact surfaces, wherein a sealing ring is arranged on the upper side of the cover part, wherein the sealing ring is in sealing contact with the bent upper section of the wall.

The sealing ring is placed on the upper side of the cover part during manufacture, preferably before the upper section of the raised, circumferential wall of the lower part is bent or flanged, wherein the sealing ring is in sealing contact with this upper wall section after it has been bent or flanged.

It has been shown that a sealing ring arranged at the above-mentioned position significantly improves the mechanical sealing of the interior of the switch.

Since, in contrast to many previously known solutions, no insulating foil is used for the mechanical sealing of the interior of the switch, but rather the additional sealing ring mentioned above, the center of the cover part may be left free for the connecting leads to be attached to it. Thus, the semi-finished product of the switch is already completely sealed before the connection technology is attached to the switch. This provides the immense advantage that no solder or soldering flux can penetrate into the inside of the switch, for example, if the connecting leads are soldered to the contact surface(s) provided in the middle of the cover part. A final manual sealing of the switch is no longer necessary.

If the switch is coated with an impregnating varnish or protective lacquer after the connecting leads have been attached in order to provide an electrical insulation for the connecting leads, the sealing ring which is provided according to the present invention also guarantees an extremely good mechanical sealing which prevents such varnishes or resins from penetrating into the interior of the switch.

The inventive solution also provides immense advantages from a production point of view. The individual components of the housing do not have to be specially provided with stamping burrs or a bead to ensure a mechanical seal. It is simply a matter of arranging the sealing ring on the upper side of the cover part, preferably before the upper section of the wall is flanged. This can be done fully automatically.

The increased tightness achieved with the sealing ring and the associated greater flexibility during production far outweigh the costs of the now additionally provided sealing ring.

The sealing ring is typically a very cost-effective component anyway, which can be stored without problems and is easy to handle in an automated production.

It is to be mentioned at this point that in addition to the sealing ring, an insulating foil may also be used with the switch. This is preferred if both the cover part and the lower part of the housing are made of an electrically conductive material and the two parts of the housing must be electrically insulated. In such a case, however, the insulating foil mainly takes over the function of electrically insulating the two housing parts, since, as mentioned above, the mechanical sealing is achieved via the sealing ring which is in sealing contact with the bent, upper section of the wall.

If an insulating foil is used for the electrical insulation of the two parts of the housing, it is preferred that the sealing location where the sealing ring is arranged is free of the insulating foil.

According to a refinement, the sealing ring is connected to the upper side of the cover part and/or to the bent upper section of the wall by means of a material bond. Preferably, the sealing ring is connected to both the upper side of the cover part and to the bent upper section of the raised wall of the lower part by means of a material bond.

The sealing effect achieved by the sealing ring is additionally improved by this material-locking connection. From a manufacturing point of view, such a material-locking connection may be produced very easily and cost-effectively.

Preferably, the sealing ring is glued hot stamped or welded by a welded joint produced by means of ultrasonic welding to the upper side of the cover part and/or to the bent upper section of the wall.

Welding the sealing ring by means of ultrasonic welding has proven to be particularly advantageous. Ultrasonic welding can be used to produce a clean and long-lasting connection of the sealing ring with the upper side of the cover part and/or the bent edge of the upper section of the wall of the lower part. The sealing effect is thus significantly improved at the aforementioned joints.

A further advantage is that, e.g. in comparison to gluing the above-mentioned components, the welding process may be carried out by means of ultrasonic welding even after the sealing ring has been mounted on the upper side of the cover part and the upper section of the wall of the lower part has been bent or flanged. This significantly simplifies the handling from a manufacturing point of view.

Due to the comparatively low heat generation generated during ultrasonic welding, temperature-related damage inside the switch, especially to the sensitive switching mechanism, can be effectively prevented. This also applies if the housing of the switch is mainly made of metal. Despite the very good heat conduction properties of the metal, the comparatively low heat generation that occurs during ultrasonic welding does not cause the stationary contact, which is typically arranged on the cover part of the housing, to undesirably become detached. There is also no danger of the stationary contact and the movable contact member of the switching mechanism being welded together during the ultrasonic welding process. The risk of the snap discs being damaged by the ultrasonic welding process is also reduced to a minimum.

A further advantage is that no filler materials are required for ultrasonic welding. This allows more compact welding seams to be produced. In addition, the environment is significantly less polluted, as the use of environmentally harmful materials, which are typically included in the filler materials, may be completely avoided.

In ultrasonic welding, the welding of the components to be joined is achieved by means of a high-frequency mechanical oscillation. The generated oscillation leads to heating between the components to be joined due to molecular friction and interfacial friction. If the components to be joined are metals, the mechanical oscillation generated by ultrasound causes the joining partners to indent and interlock at the joint.

In ultrasonic welding tools, a generator generates electronic oscillations which are converted into mechanical oscillations by an ultrasonic converter. These are fed to the components to be joined via a so-called sonotrode. Within fractions of a second, the ultrasonic oscillations generated in this way generate frictional heat on the joining surfaces of the components to be joined, which causes the material to melt and to join the components together.

The parameters to be set during ultrasonic welding, such as amplitude and frequency, can be adapted to the conditions. The parameters to be set and their respective values can be taken from the relevant standards.

According to another refinement, the sealing ring is configured as an annular plastic ring.

The cross section of the sealing ring may be selected as desired, e.g. circular (O-ring), triangular (delta ring), rectangular, square (quad ring) or oval. More complex cross-sectional shapes are also conceivable. The sealing ring may just as well be a common flat gasket.

All common sealing materials, such as fluoroplastics, polyaryletherketones, polyamides, polyacetals or polyethylenes, may be considered as materials for the sealing ring.

According to another refinement, it is preferred that the sealing ring is clamped between the upper section of the wall and the upper side of the cover part.

In this refinement, the flanged, upper edge of the lower part presses on the sealing ring, preferably from above, pressing it onto the upper side of the cover part. It is preferred that the sealing ring is clamped between a free end face of the upper, flanged section of the wall and the upper side of the cover part.

The upper section of the raised wall of the lower part is during manufacturing therefore simply bent onto the sealing ring which is arranged on the upper side of the cover part. This manufacturing step may be fully automated.

According to a further refinement, the upper section of the wall penetrates at least partially into the sealing ring.

Preferably, the upper section of the wall with its free, circumferential end face or edge penetrates at least partially into the sealing ring. Although the sealing ring is partially destroyed by the penetration of the wall, the mechanical sealing is additionally improved by the penetration of the wall at the sealing location, since a further mechanical/physical barrier is created.

Alternatively, it is also possible to first flange the upper section of the wall and then attach the sealing ring to the upper side of the cover part. For example, in a refinement the upper section of the wall presses in a mounting area directly or indirectly with an interposed insulating foil onto the upper side of the cover part. The upper section of the wall may thus also be flanged directly onto the upper side of the cover part or it may press on an insulating foil which is arranged between the flanged edge and the cover part.

According to a refinement, a radially inner edge of the sealing ring is at a smaller distance from a centrally arranged central axis of the switch than the mounting area, and that the sealing ring, preferably with its radially outer edge, abuts an outer side of the upper section of the wall that faces the central axis of the switch.

In this case, the mounting area is understood to be the contact area in which the bent or flanged upper section of the wall touches the upper side of the cover part directly or indirectly with an interposed insulating foil.

Thus, in this case the sealing ring is arranged radially further inside than the flanged edge. The sealing ring may, for example, also be arranged on the cover part after the upper edge section of the wall has been flanged. It then preferably abuts the outer side of the flanged edge of the wall with its radially outer edge and, as described above, is glued, hot stamped or welded by means of a welded joint produced by ultrasonic welding to the upper side of the cover part and/or to the flanged upper section of the wall.

In an alternative refinement, a radially inner edge of the sealing ring is at a distance from the centrally arranged central axis of the switch which is equal to or larger than a distance from the mounting area to the central axis of the switch, and that the sealing ring abuts an inner side of the upper section of the wall which faces away from the central axis of the switch.

In this refinement, the upper section of the wall is thus flanged over the sealing ring, so that the sealing ring is arranged radially further outwards than the aforementioned mounting area, in which the upper, bent or flanged section of the wall presses directly or indirectly onto the upper side of the cover part. The flanged edge thereby acts as a kind of annular tunnel in which the sealing ring is arranged.

According to a further refinement, the upper section of the wall is bent by at least 90°, preferably by at least 120° when viewed in a cross-section.

The upper section of the wall may also be bent or curved by approx. 180° so that a circumferential bead is formed, which is e.g. U-shaped in cross-section. However, the upper section of the peripheral wall may be bent inwards even by at least 120°, since the end face of the bent wall section then comes into contact from above with the upper side of the cover part or with the insulating foil arranged on it in such a way that the cover part is held sufficiently well on the lower part of the housing.

As already mentioned at the outset, the lower part and the cover part may each be made of electrically conductive material and an insulating foil may be arranged between the cover part and the lower part.

In this case, it is preferred that a first one of the two contact surfaces is arranged on the cover part and a second one of the two contact surfaces is arranged on the lower part, and that the switching mechanism carries a movable contact member which interacts with a stationary counter contact arranged on an inner side of the cover part and interacting with the first of the two contact surfaces. This basic switch design corresponds, for example, to the design disclosed in DE 10 2013 102 089 A1.

According to an alternative refinement, the lower part is made of an electrically conductive material and the cover part is made of an insulating material or PTC material.

In this case, the two contact surfaces may be arranged on the cover part and the switching mechanism may support a current transfer member which interacts with two stationary counter contacts arranged on an inner side of the cover part and each interacting with one of the two contact surfaces. Such a basic switch design corresponds, for example, to the design disclosed in DE 198 27 113 C2.

Irrespective of the construction of the switch housing and the switching mechanism, the switching mechanism preferably comprises a bi-metal member which supports a movable contact member and thus carries the current through the switch.

The bi-metal part may be a round, preferably circular bi-metal snap disc, wherein it is also possible to use an elongated bi-metal spring clamped on one side as the bi-metal part.

However, it is preferred that the switching mechanism additionally comprises a spring snap disc, which then supports the movable contact member and carries the current through the closed switch and provides the contact pressure in the closed state. In this way, the bi-metal part is relieved of both the current carrying and the mechanical load in the closed state, which increases the service life of the switch and ensures that the switching temperature remains stable in the long term.

The presented switch is suitable for round temperature-dependent switches, i.e. which are round, circular or oval when viewed in a plan view on the lower part, wherein other housing shapes may also be used.

Further features and advantages of the herein presented switch emerge from the attached drawings and the subsequent description.

It is to be understood that the features mentioned above and the features yet to be explained below are usable not only in the combination provided in each case but also in other combinations or standing alone without departing from the spirit and scope of the present disclosure.

DESCRIPTION OF PREFERRED EMBODIMENTS

Figure 1:
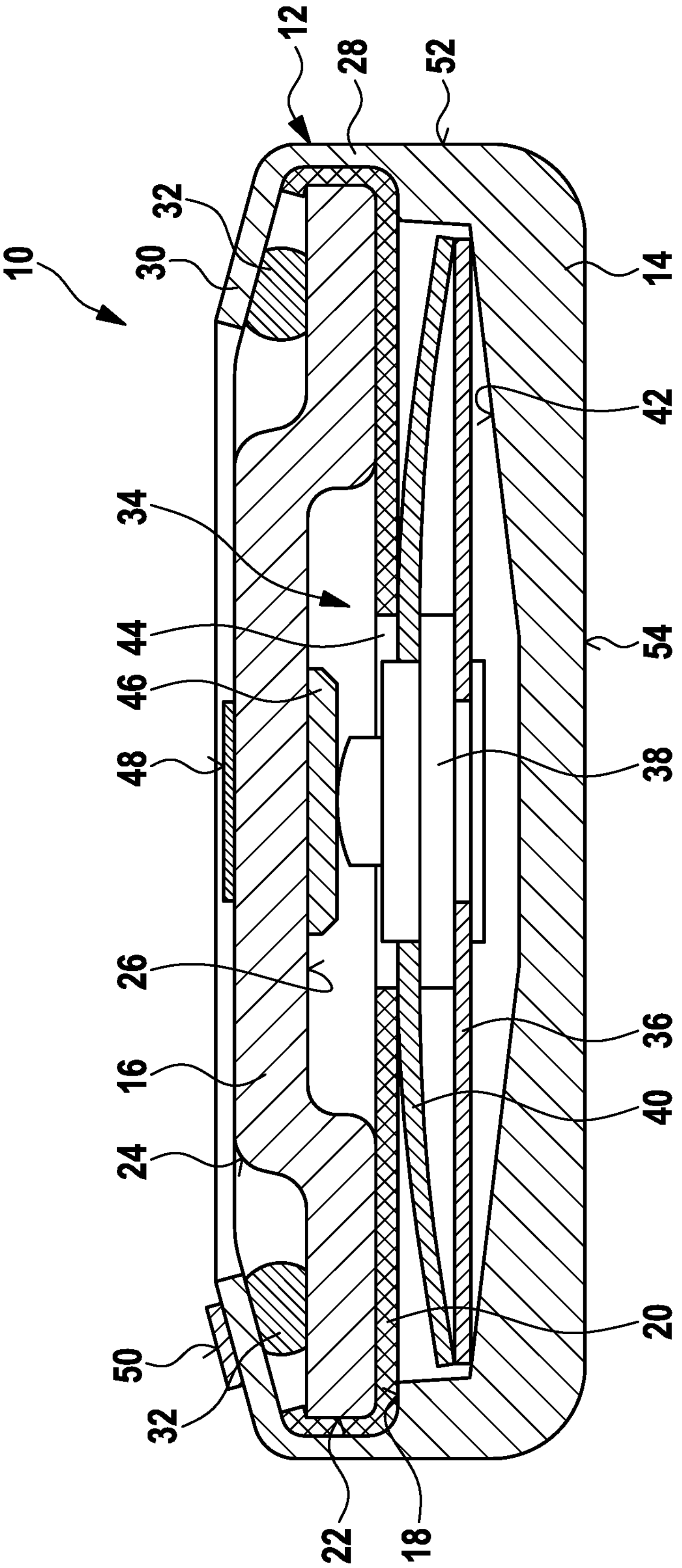
FIG. 1 shows a schematic sectional view of a first embodiment of the temperature-dependent switch.

FIG. 1 shows schematically, not to scale and in a lateral cross section a temperature-dependent switch 10, which comprises a housing 12, which comprises an electrically conductive, pot-like lower part 14 and an electrically conductive, plate-like cover part 16.

In the lower part 14, which is circular in a plan view, an inner circumferential shoulder 18 is provided, on which the cover part 16 that closes the lower part 14 rests with an insulating foil 20 interposed therebetween.

The cover part 16 comprises a circumferential wall 22 which separates an upper side 24 from an inner side 26. The insulating foil 20 extends along the inner side 26 and along the circumferential wall 22 and reaches with its upper edge up to the upper side 24.

The lower part 14 comprises a cylindrical circumferential, raised wall 28, the upper section 30 of which is bent or flanged onto the upper side 24 of the cover part 16. In this way, the cover part 16 is held on the lower part 14 with the interposed insulating foil 20.

The insulating foil 20 provides an electrical insulation of the cover part 16 against the lower part 14. Although the insulating foil 20 also provides a mechanical sealing that prevents liquids or contaminants from entering the inside of the housing from the outside. However, a sealing ring 32 is provided as additional mechanical sealing, which sealing ring is in sealing contact with the bent upper section 30 of the wall 28. This sealing ring 32 is arranged on the upper side 24 of the cover part 16.

In the first embodiment shown in FIG. 1, the sealing ring 32 is clamped between the upper section 30 of the wall 28 and the upper side 24 of the cover part 16. During the manufacture of the temperature-dependent switch 10, the sealing ring 32 is preferably placed on the upper side 24 of the cover part 16 before the upper section 30 of the wall 28 is bent or flanged inwards. The sealing ring 32 is then clamped between the wall 28 and the cover part 16 by bending or flanging the upper section 30 of the wall 28. The above manufacturing steps may be fully automated.

The sealing ring 32 may additionally be glued to the cover part 16. The sealing ring 32 may also be glued to the bent upper section 30 of the wall 28. This gluing can also be carried out fully automatically, for example by applying a suitable adhesive to the upper and lower sides of the sealing ring 32 before it is arranged on the cover part 16 and clamped between the cover part 16 and the bent upper section 30 of wall 28.

However, not only for reasons of improving the sealing effect of the sealing ring 32, but also from a manufacturing point of view, it is preferred to create a material bond between the sealing ring 32, the upper side 24 of the cover part 16 and/or the bent upper section 30 of the wall 28 by means of a welded joint produced by ultrasonic welding. This welded joint produced by ultrasonic welding may also be produced after the upper section 30 of the wall 28 has already been bent or flanged and the sealing ring 32 has been clamped underneath.

Alternatively, a material bond between the above-mentioned components 32, 16, 30 may also be created by hot stamping.

However, depending on the clamping force generated by the bent or flanged upper section 30 of the wall 28, it may be sufficient to simply arrange the sealing ring 32 on the cover part 16 and clamp it between the upper section 30 and the upper side 24.

In the herein shown embodiment, the sealing ring 32 is a plastic O-ring. In general, however, other circular plastic rings may be used in the same or a similar way, for example with a triangular, rectangular, square, oval or complexly shaped cross-section.

In the housing 12 of the switch 10, which is formed by the lower part 14 and the cover part 16, a temperature-dependent switching mechanism 34 is arranged, which comprises a spring snap disc 36, which centrally supports a movable contact member 38, on which a freely inserted bi-metal snap disc 40 sits.

The spring snap disc 36 is supported on a bottom 42 on the inside of the lower part 14, while the movable contact member 38 is in contact with a stationary counter contact 46 through a central opening 44 in the insulating foil 20, wherein the stationary counter contact 46 is arranged on the inner side 26 of the cover part 16.

Two contact surfaces 48, 50 are used as the external connection of the switch 10 of FIG. 1. A first contact surface 48 is formed in a central area of the upper side 24 of the cover part 16. A second contact surface 50 is formed on the bent upper section 30 of wall the 28. However, a contact surface, which is formed on the circumferential outer wall 52 of the housing or on the lower side 54 of the lower part 14, may also be used as a second contact surface 50.

The lower side 54 of the lower part 14 is preferably configured to be flat. Via this lower side 54 the switch 10 can be thermally coupled to a device to be protected.

In this way, the temperature-dependent switching mechanism 34 establishes in the low-temperature position shown in FIG. 1 an electrically conductive connection between the two outer contact surfaces 48, 50, wherein the operating current flows via the stationary counter contact 46, the movable contact member 38, the spring snap disc 36 and the lower part 14.

If the temperature of the bi-metal snap disc 40 of the switch 10 shown in FIG. 1 increases, via the thermal contact on the lower side 54 to the device to be protected, above its response temperature, it snaps over from the convex position shown in FIG. 1 to its concave position in which it lifts the movable contact member 38 from the stationary contact 46 against the force of the spring snap disc 36, thus opening the electrical circuit.

Figure 2:
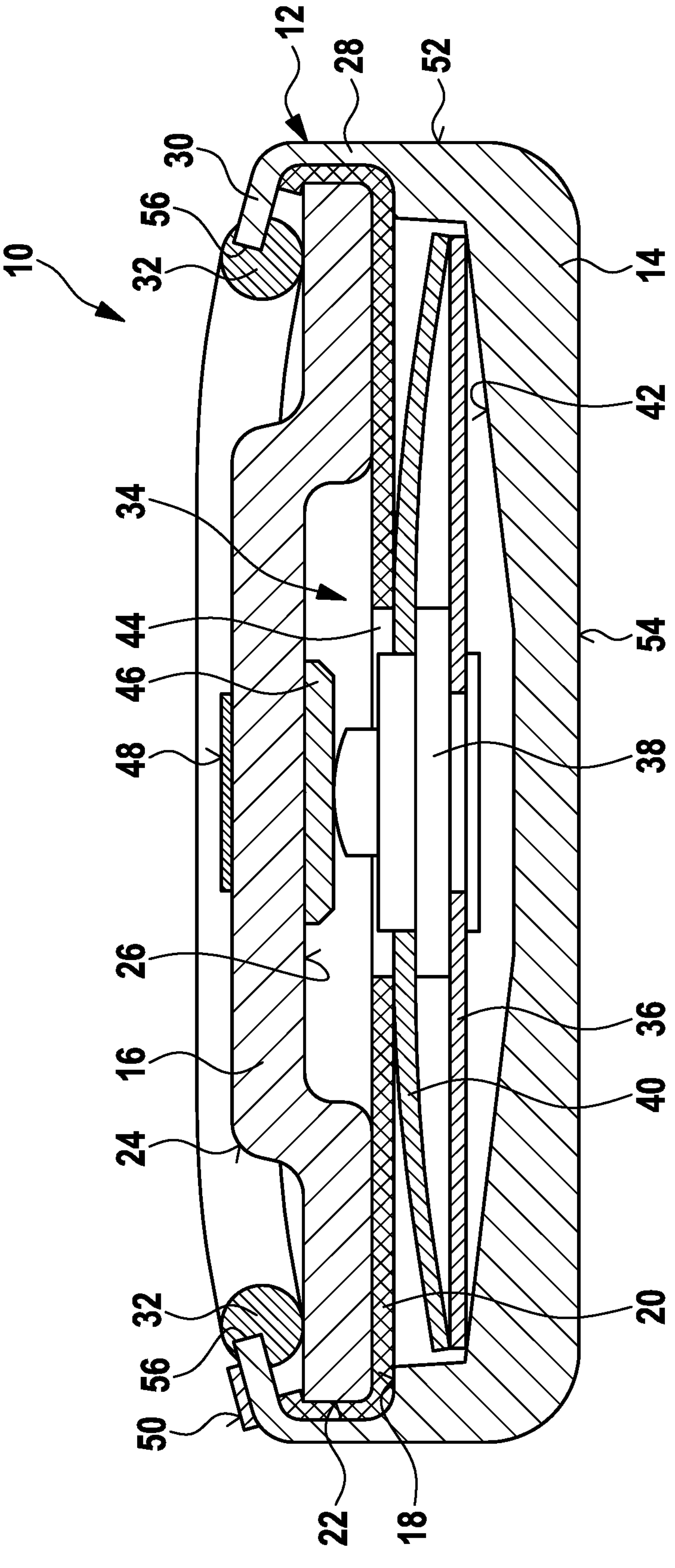
FIG. 2 shows a schematic sectional view of a second embodiment of the temperature-dependent switch.

FIG. 2 shows a second embodiment of the switch 10, wherein the same reference numerals are used as before for identical components and design features.

In contrast to the first embodiment shown in FIG. 1, the upper section 30 of the wall 28 here penetrates at least partially into sealing ring 32. Preferably, the upper section 30 of the wall 28 circumferentially penetrates into the sealing ring 32 with its free, frontal edge 56 along the entire outer circumference. A penetration depth of at least 10% of the diameter of sealing ring 32 is preferred.

In the embodiment shown in FIG. 2, the upper section 30 of the wall 28 penetrates into the sealing ring 32 laterally from outside. However, it is also possible that the upper section 30 of the wall 28 penetrates into sealing ring 32 from above. To do this, the upper section 30 of the wall 28 would only have to be flanged slightly further than shown in FIG. 2, for example by a total of 180°.

Since the circumferential edge 56 of the wall 28 penetrates into sealing ring 32, the sealing effect of the sealing ring 32 can be further improved, as an additional mechanical barrier is created.

In the embodiment shown in FIG. 2, the sealing ring 32 is still pressed onto the upper side 24 of the cover part 16 by the bent or flanged upper section 30 of the wall 28. In this way the sealing ring 32 also seals the interface between the lower side of the sealing ring 32 and the upper side 24 of the cover part 16.

Even with an arrangement of the sealing ring 32 as shown in FIG. 2, it is preferred that the sealing ring 32 is connected to the upper side 24 of the cover part 16 and/or the upper section 30 of the wall 28 by means of a material bond. As already mentioned above, this may be done by gluing, hot stamping or welding the above-mentioned components using ultrasound.

Figure 3:
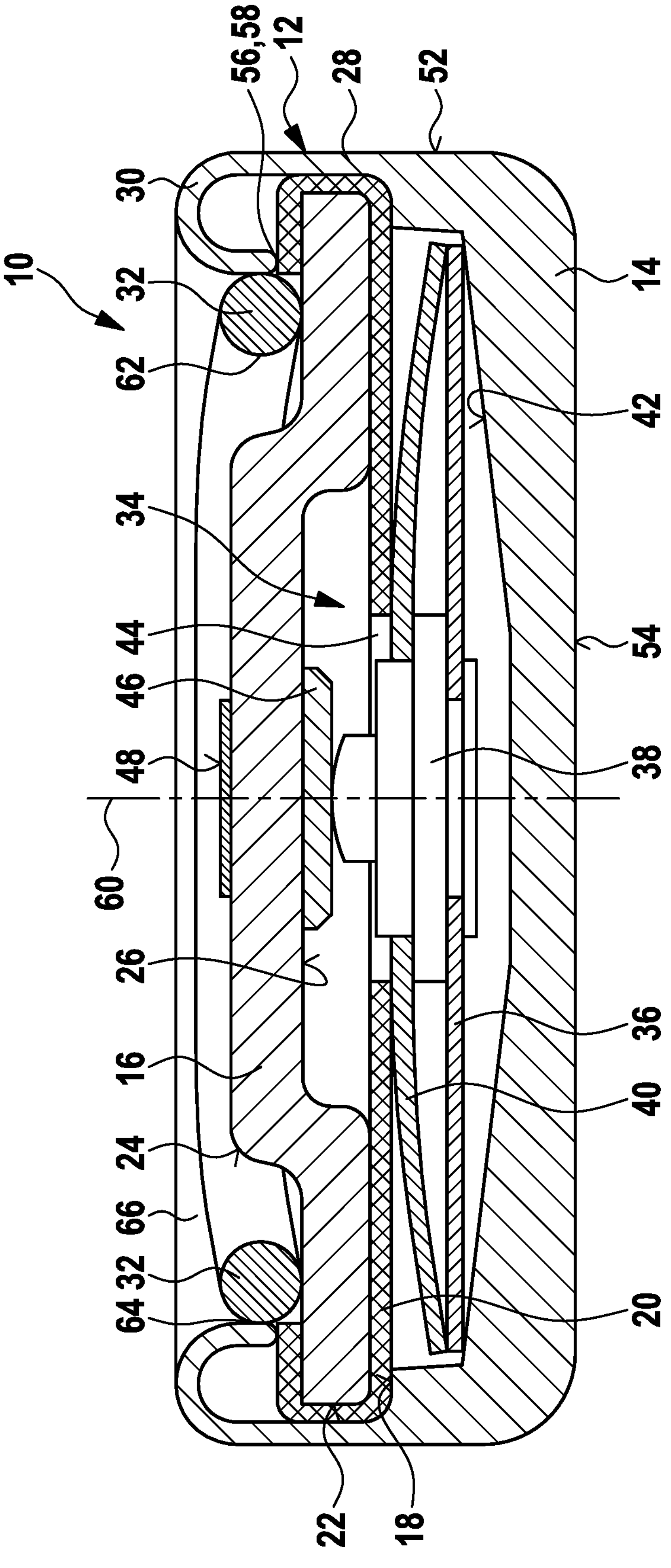
FIG. 3 shows a schematic sectional view of a third embodiment of the temperature-dependent switch.

FIG. 3 shows a third embodiment of the switch 10. In this embodiment, the upper section 30 of the wall 28 is flanged by 180° or at least approximately 180° so that its cross-section essentially corresponds to the shape of an upside down U. The frontal edge 56 of the flanged upper section 30 of the wall 28 presses vertically or almost vertically onto the upper side 24 of the cover part 16 with the interposed insulating foil 20.

The area in which the edge 56 presses from above onto the cover part 16 with the interposed insulating foil 20 is referred to in the present case as mounting area 58. This mounting area 58 is a circumferential circular line or a annular surface, where the mechanical pressure is transferred from the wall 28 of the lower part 14 to the cover part 16.

In order to prevent a short circuit between the lower part 14 and the cover part 16 in this area, the insulating foil 20 is, according to this embodiment, pulled slightly further upwards and folded over onto the upper side 24 of the cover part 16.

If the lower part 14 or the cover part 16 is made of an insulating material, the flanged upper section 30 of the wall 28 may also press directly (without the interposed insulating foil 20) with its edge 56 onto the upper side 24 of the cover part 16.

It also goes without saying that the insulating foil 20 may also be continued further, up to under the sealing ring 32, if the lower part 14 and the cover part 16 are made of an electrically conductive material.

In the embodiment shown in FIG. 3, the sealing ring 32 is applied from radially inside to the flanged upper section 30 of the wall 28. A radially inner edge 62 of the sealing ring 32 is therefore at a smaller distance from the centrally arranged central axis 60 of the switch 10 than the mounting area 58.

On the opposite side, the sealing ring 32 abuts with its radially outer edge or edge area 64 an outer side 66 of the flanged upper section 30 of the wall 28, which, as can be seen from FIG. 3, faces the centrally arranged central axis 60 of the switch 10.

Here too, the sealing ring 32 is preferably connected to the outer side 66 of the flanged upper section 30 of the wall 28 by means of a material bond in order to improve its sealing effect. Likewise, the sealing ring 32 is preferably also connected to the upper side 24 of the cover part 16 by means of a material bond. The material-locking connection of the sealing ring 32 with the outer side 66 of the wall 28 and the upper side 24 of the cover part 16 creates several mechanical barriers which prevent impurities from penetrating into the inside of the switch. In order to get into the switch interior, impurities would first have to pass the sealing ring 32 to reach the mounting area 58, which is almost impossible due to the material connection between sealing ring 32 and the outer side 66 and the upper side 24. In addition, a further mechanical barrier is provided in the mounting area 58, since the edge 56 of the flanged upper section 30 of the wall 28 presses on the insulating foil 20 here or even penetrates into it partially. The same applies if the edge 56 presses directly on the upper side 24 of the cover part 16 (without the interposed insulating foil 20).

Figure 4:
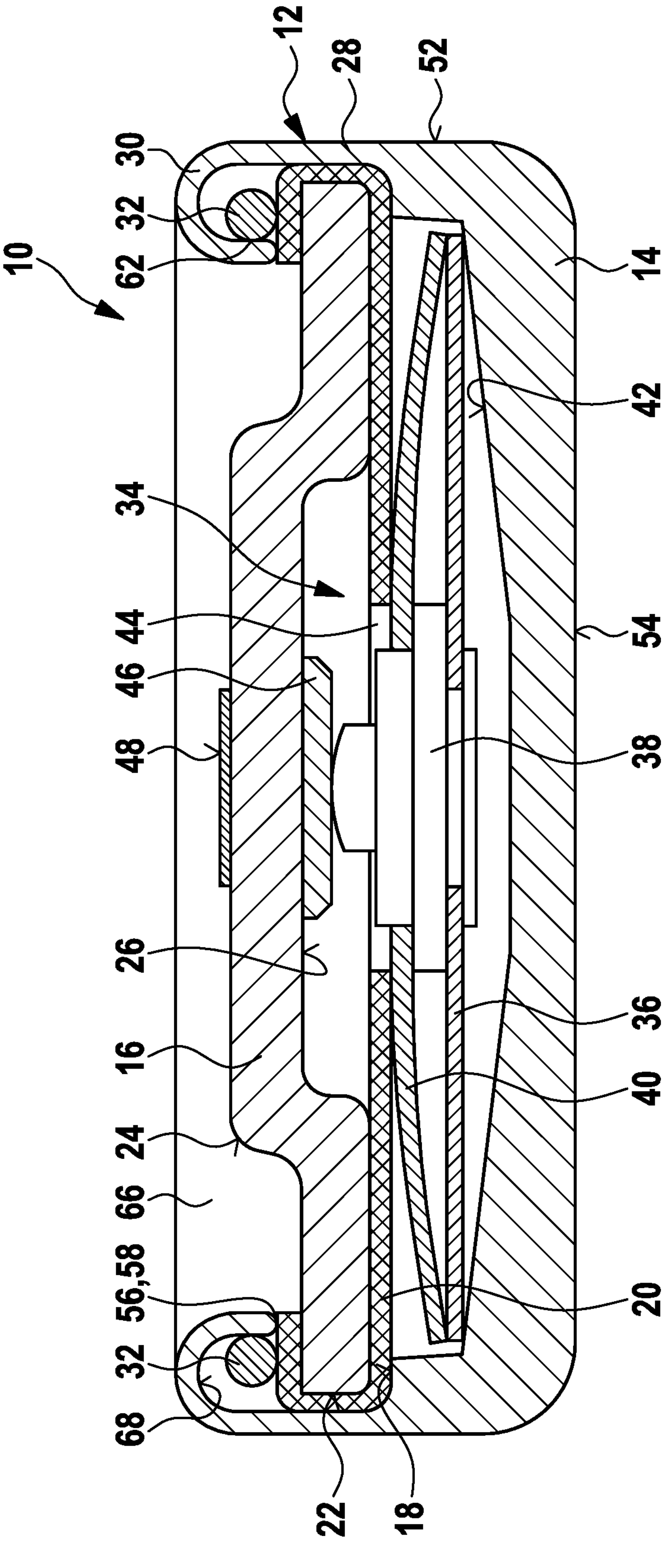
FIG. 4 shows a schematic sectional view of a fourth embodiment of the temperature-dependent switch.

In the fourth embodiment shown in FIG. 4, the upper section 30 of the wall 28 is flanged to an inverted U in the same or at least similar manner as in the third embodiment shown in FIG. 3. The sealing ring 32, in contrast to this, is now, however, arranged radially further outwards and abuts the flanged upper section 30 of the wall 28 from the inside on an inner side 68, which faces away from the centrally arranged central axis 60 and is opposite the outer side 66.

Thus, the sealing ring 32 here abuts with its radially inner edge 62 the inner side 68 of the flanged upper section 30 of the wall 28. Accordingly, the radially inner edge 62 of the sealing ring 32 is at a larger distance from the centrally arranged central axis 60 of the switch 10 than the mounting area 58, in which the edge 56 of the flanged upper section 30 of the wall 28 presses onto the cover part 16 with the interposed insulating foil 20.

Also in this embodiment, the sealing ring 32 is preferably connected to the inner side 68 of the flanged upper section 30 of the wall 28 by means of a material bond. The sealing ring 32 is also preferably connected to the upper side 24 of the cover part by means of a material bond, either directly or indirectly with the insulating foil 20 interposed therebetween.

Also in this embodiment, it is possible that the flanged upper section 30 of the wall 28 presses with its edge 56 directly onto the upper side 24 of the cover part 16, provided that no electrical insulation is required between the lower part 14 and the cover part 16. In such a case, it is preferred that also the sealing ring 32 is directly arranged on the upper side 24 of the cover part 16 and is connected to it by means of a material bond.

Figure 5:
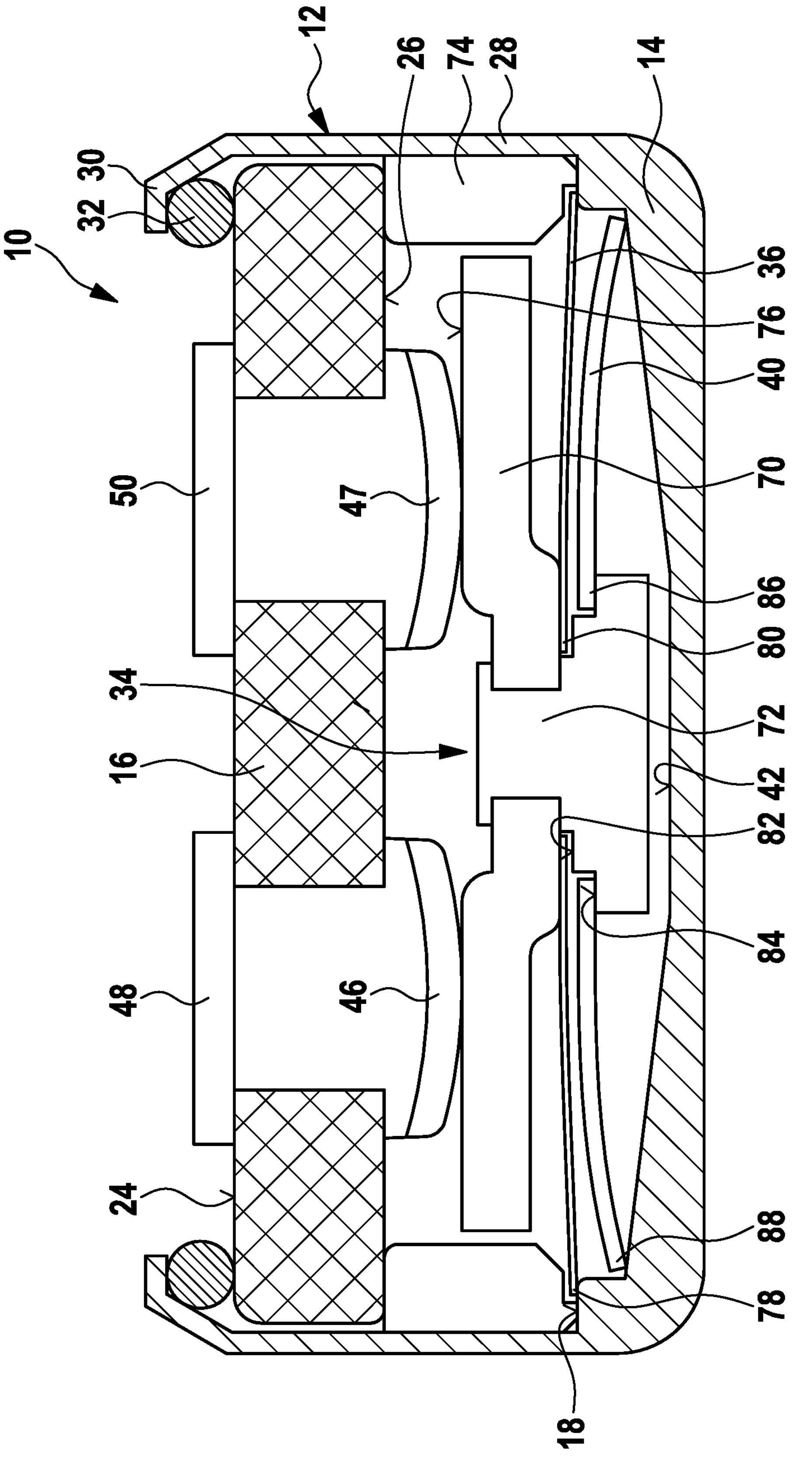
FIG. 5 shows a schematic sectional view of a fifth embodiment of the temperature-dependent switch.

FIG. 5 shows a fifth embodiment of the switch 10. The arrangement of the sealing ring 32 is at least equal or similar to the arrangement of the sealing ring 32 as described above with regard to the first embodiment shown in FIG. 1. The sealing ring 32 is clamped between the bent upper section 30 of the wall 28 and the upper side 24 of the cover part 16.

However, the fifth embodiment shown in FIG. 5 differs from the embodiments shown in FIGS. 1 to 4 in the way the switching mechanism 34 and the housing 12 are designed. For the sake of simplicity, the previously used reference numerals were also used in FIG. 5 for identical or equivalent components.

The housing 12 here comprises a pot-shaped lower part 14 made of electrically conductive material. The cover part 16 of the housing 12 is in the embodiment shown in FIG. 5, however, made of insulating material or PTC material. An insulation by means of an insulating foil, as used in the embodiments shown in FIGS. 1 to 4, is therefore not necessary here.

A spacer ring 74 is provided between the cover part 16 and the lower part 14, which spacer ring 74 keeps the cover part 16 at a distance from the lower part 14.

Two stationary counter contacts 46, 47 are provided on the cover part 16. The counter contacts 46 and 47 are configured as rivets, which extend through the cover part 16 and end outside in the heads 48, 50, which serve as contact surfaces for the external connection of the switch 10.

The switching mechanism 34 comprises a current transfer member 70 as a contact element, which current transfer member 70 is designed as a contact plate or contact bridge, the upper side 76 of which is coated in an electrically conductive manner, so that the current transfer member 70, in the closed position of the switch 10 shown in FIG. 5, rests against the counter contacts 46, 47 and provides an electrically conductive connection between the two counter contacts 46, 47.

The current transfer member 70 is connected to a bistable spring snap disc 36 and a bistable bi-metal snap disc 40 via a rivet 72, which is also to be regarded as part of the contact element.

A circumferential shoulder 18 is again provide inside the lower part 14, on which circumferential shoulder 18 the spacer ring 74 rests. Between the shoulder 18 and the spacer ring 74 the spring snap disc 36 is clamped with its edge 78 while it rests with its center 80 on a shoulder 82 on the rivet 72. At its center 80 the spring snap disc 36 is thus clamped between the current transfer member 70 and the shoulder 82.

In FIG. 5 further downwards and radially further outwards, a shoulder 84 is provided on the rivet 72, on which the bi-metal snap disc 40 rests with its center 86. The center 86 of the bi-metal snap disc 40 rests freely on the shoulder 84. The edge 88 of the bi-metal snap disc 40 rests freely on the inner bottom 42 of the lower part 14.

The switching operation of the switch 10 shown in FIG. 5 is carried in a similar way as with the embodiments of the switch 10 shown in FIGS. 1 to 4 by snapping the bi-metal snap disc 40 from its low temperature position (shown in FIG. 5) to its high temperature position or vice versa. If the bi-metal snap disc 40 snaps over into its high temperature position (not shown here), the current transfer member 70 is lifted downwards from the two stationary contacts 46, 47 in FIG. 5, thus interrupting the electrical circuit and preventing the device to be protected from heating up further.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms “for example,” “e.g.,” “for instance,” “such as,” and “like,” and the verbs “comprising,” “having,” “including,” and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A temperature-dependent switch, comprising:

a housing having a cover part, a lower part, and first and second contact surfaces, the cover part includes an upper side, an inner side opposite the upper side, and a circumferential wall extending between and transverse to the upper side and the inner side, the lower part includes a raised wall with a flanged upper section, the flanged upper section includes an inner side, an outer side, and a frontal edge extending between and transverse to the inner side and the outer side, the flanged upper section is bent towards the upper side of the cover part so that the frontal edge directly contacts the cover part at a mounting area, the mounting area is an area at the upper side of the cover part where mechanical pressure is transferred directly from the frontal edge of the lower part to the upper side of the cover part;

a switching mechanism arranged in the housing such that the inner side of the cover part faces the switching mechanism, the switching mechanism is configured to switch, depending on its temperature, between a closed state where an electrically conductive connection between the first and second contact surfaces is established, and an open state where the electrically conductive connection between the first and second contact surfaces is interrupted; and a sealing ring arranged on the upper side of the cover part and having a radially inner edge and a radially outer edge, wherein the sealing ring is arranged on at least one of a radial inside of the mounting area or a radial outside of the mounting area, when the sealing ring is arranged on the radial inside of the mounting area, the radially outer edge of the sealing ring directly contacts the outer side of the flanged upper section, and when the sealing ring is arranged on the radial outside of the mounting area, the radially inner edge of the sealing ring directly contacts the inner side of the flanged upper section.

2. The temperature-dependent switch of claim 1, wherein at least one of the cover part or the lower part includes an insulating material or a positive temperature coefficient (PTC) material.

3. The temperature-dependent switch of claim 2, wherein the cover part includes the insulating material or the positive temperature coefficient (PTC) material and the lower part includes an electrically conductive material.

4. The temperature-dependent switch of claim 1, wherein the sealing ring is arranged on the radial inside of the mounting area, and the sealing ring directly contacts the upper side of the cover part.

5. The temperature-dependent switch of claim 1, wherein the sealing ring is arranged on the radial inside of the mounting area, and the radially inner edge of the sealing ring is at a first distance from a central axis of the temperature-dependent switch and the mounting area is at a second distance from the central axis of the temperature-dependent switch, and the second distance is larger than the first distance.

6. The temperature-dependent switch of claim 1, wherein the sealing ring is arranged on the radial outside of the mounting area, and the radially outer edge of the sealing ring is at a first distance from a central axis of the temperature-dependent switch and the mounting area is at a second distance from the central axis of the temperature-dependent switch, and the first distance is larger than the second distance.

7. The temperature-dependent switch of claim 1, wherein the sealing ring is connected to the flanged upper section with a first material bond.

8. The temperature-dependent switch of claim 7, wherein the sealing ring is connected to the upper side of the cover part with a second material bond.

9. The temperature-dependent switch of claim 7, wherein the first material bond is formed by gluing, hot stamping, or ultrasonic welding the sealing ring to the flanged upper section.

10. The temperature-dependent switch of claim 1, wherein the sealing ring includes an annular plastic ring.

11. The temperature-dependent switch of claim 1, wherein the flanged upper section is bent towards the upper side of the cover part to as to form a bead having a U-shaped cross-section.

12. The temperature-dependent switch of claim 1, wherein the first contact surface is arranged on the cover part and the second contact surface is arranged on the lower part, the switching mechanism supports a movable contact member which interacts with a stationary counter contact, and the stationary counter contact is arranged on the inner side of the cover part and is coupled to the first contact surface.

13. The temperature-dependent switch of claim 1, wherein the first and second contact surfaces are arranged on the cover part and the switching mechanism supports a current transfer member which interacts with two stationary counter contacts that are arranged on the inner side of the cover part, each of the stationary counter contacts is coupled to one of the first or second contact surfaces, respectively.

14. The temperature-dependent switch of claim 1, wherein the switching mechanism includes a bi-metal member.

15. The temperature-dependent switch of claim 1, wherein the switching mechanism includes a spring snap disc.

16. A temperature-dependent switch, comprising:

a housing having a cover part, a lower part, and first and second contact surfaces, the cover part includes an upper side, an inner side opposite the upper side, and a circumferential wall extending between and transverse to the upper side and the inner side, the lower part includes a raised wall with a flanged upper section;

an insulating foil having a first side and a second side opposite the first side, the second side directly contacting the upper side of the cover part;

a switching mechanism arranged in the housing such that the inner side of the cover part faces the switching mechanism, the switching mechanism is configured to switch, depending on its temperature, between a closed state where an electrically conductive connection between the first and second contact surfaces is established, and an open state where the electrically conductive connection between the first and second contact surfaces is interrupted; and a sealing ring having a radially inner edge and a radially outer edge, wherein the flanged upper section includes an inner side, an outer side, and a frontal edge extending between and transverse to the inner side and the outer side, the flanged upper section is bent towards the upper side of the cover part so that the frontal edge directly contacts the first side of the insulating foil at a mounting area, the mounting area is an area at the first side of the insulating foil where mechanical pressure is transferred directly from the frontal edge of the lower part to the insulating foil; and wherein the sealing ring is arranged on at least one of a radial inside of the mounting area or a radial outside of the mounting area, when the sealing ring is arranged on the radial inside of the mounting area, the radially outer edge of the sealing ring directly contacts the outer side of the flanged upper section, and when the sealing ring is arranged on the radial outside of the mounting area, the radially inner edge of the sealing ring directly contacts the inner side of the flanged upper section.

17. The temperature-dependent switch of claim 16, wherein the sealing ring is arranged on the radial outside of the mounting area, and the sealing ring directly contacts the insulating foil.

* * * * *